E. A. DIETERICH.
BRAKE MECHANISM.
APPLICATION FILED APR. 17, 1916.
1,324,734.
Patented Dec. 9, 1919.
4 SHEETS—SHEET 3.
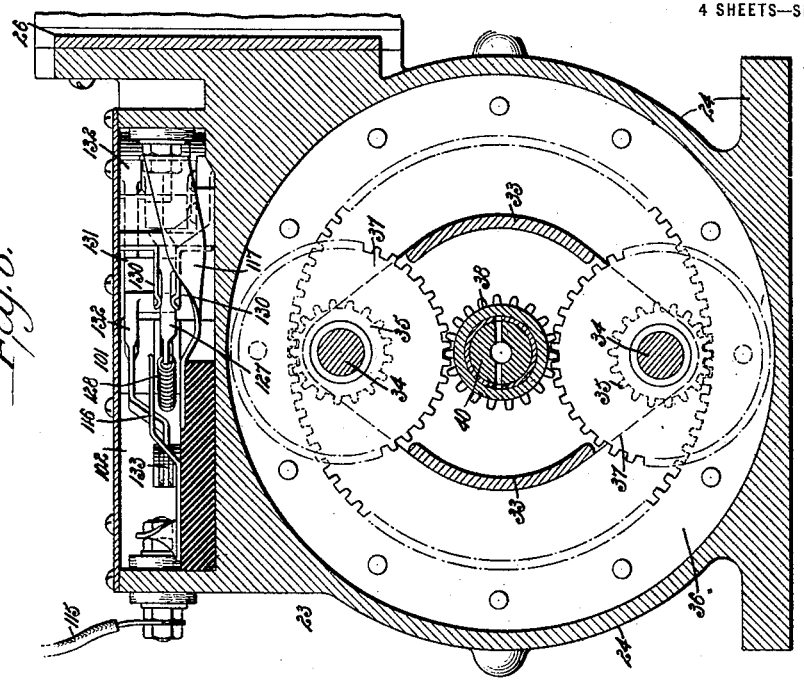
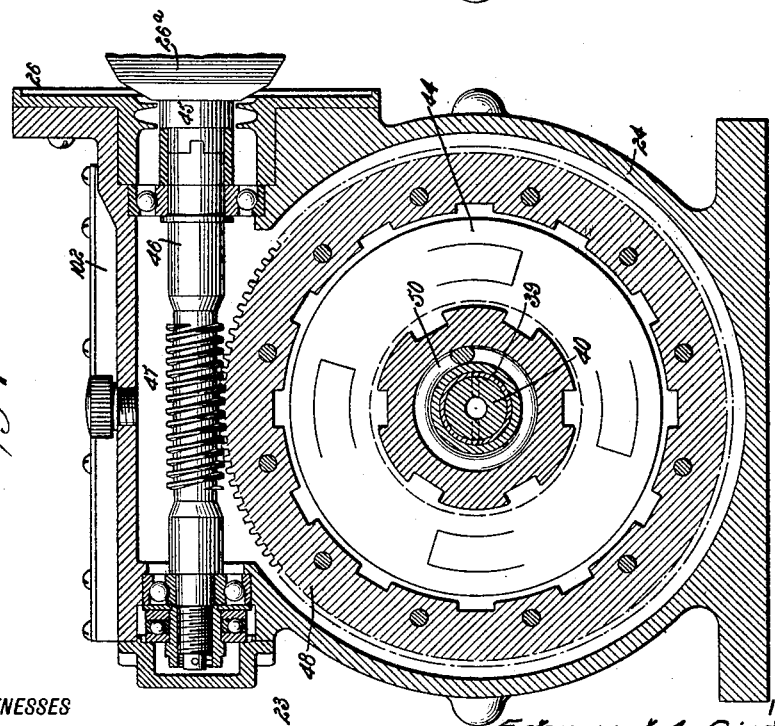

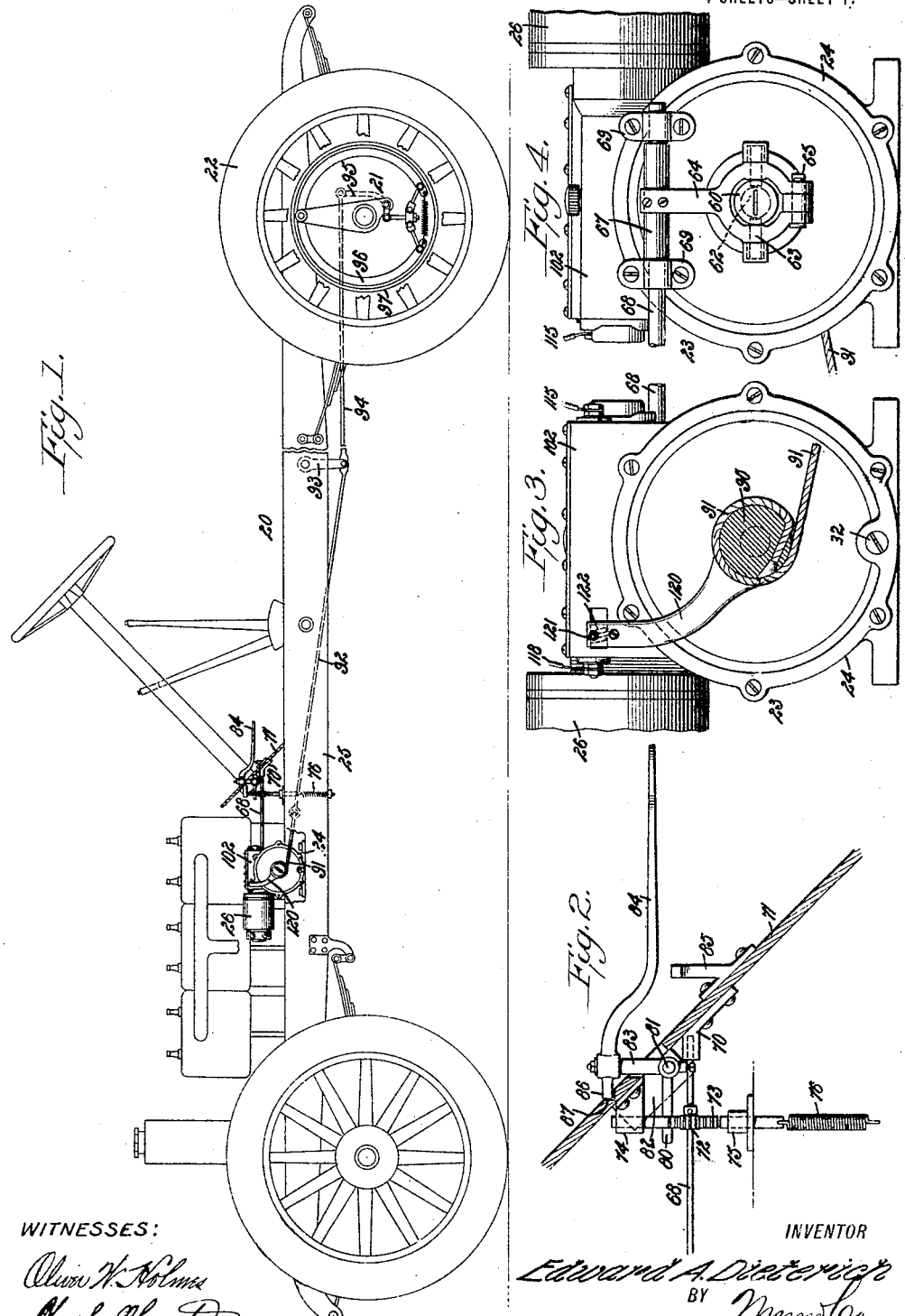

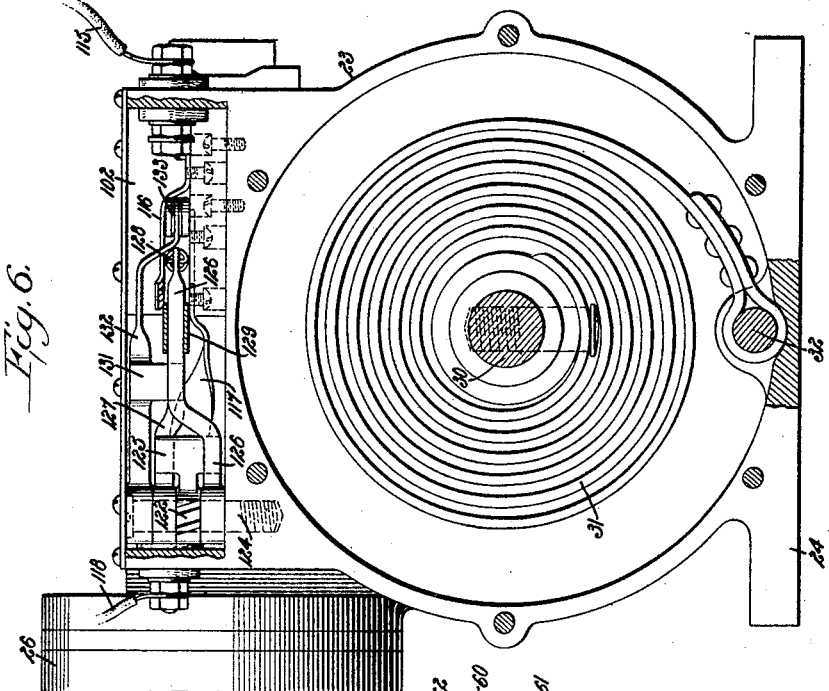

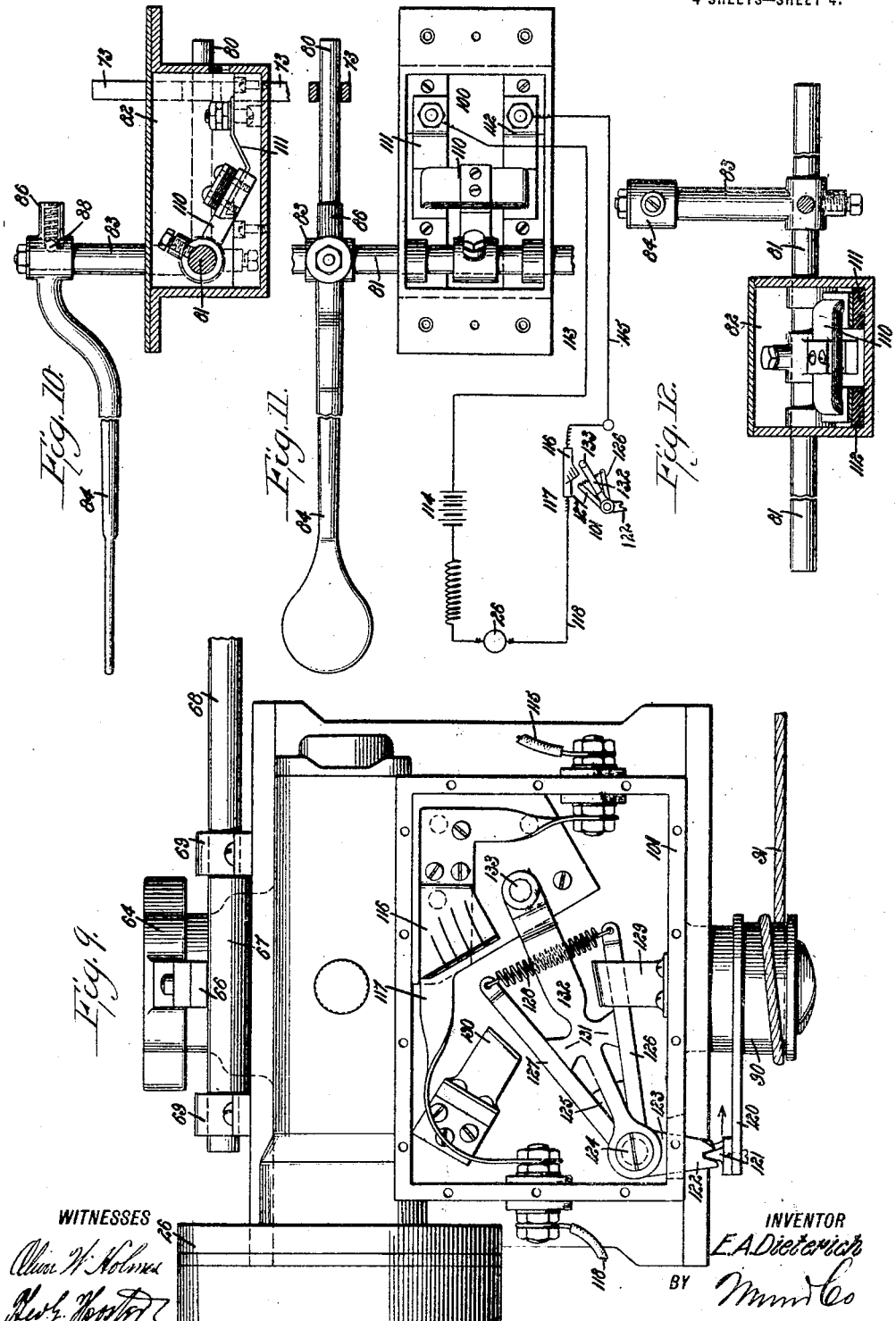

UNITED STATES PATENT OFFICE.

EDWARD A. DIETERICH, OF NEW YORK, N. Y.

BRAKE MECHANISM.

1,324,734.  Specification of Letters Patent.  Patented Dec. 9, 1919.

Application filed April 17, 1916. Serial No. 91,597.

*To all whom it may concern:*

Be it known that I, EDWARD A. DIETERICH, a citizen of the United States, and a resident of the city of New York, borough of the Bronx, in the county of Bronx and State of New York, have invented a new and Improved Brake Mechanism, of which the following is a full, clear, and exact description.

The object of the invention is to provide a new and improved brake mechanism more especially designed for use on automobiles and other vehicles and devices and arranged to insure a quick, slow, or graduated application of the vehicle brake in an exceedingly economical manner and without producing undesirable vibration.

In order to accomplish the desired result, use is made of a spring motor connected with the brake mechanism of the vehicle, a clutch having a power-driven member and a controlling member, a planetary gearing connecting the said controlling clutch member with the said spring motor, and actuating means controlled by an operator for moving the said clutch members in and out of engagement with each other.

A practical embodiment of the invention is represented in the accompanying drawing forming a part of this specification, in which similar characters of reference indicate corresponding parts in all the views.

Figure 1 is a reduced side elevation of a brake mechanism as applied to an automobile, parts of which are shown as being broken out;

Fig. 2 is a side elevation of the actuating device under the control of the operator;

Fig. 3 is a side elevation of the brake mechanism with the drum shown in section;

Fig. 4 is a rear side elevation of the same;

Fig. 5 is an enlarged cross section of the brake mechanism;

Fig. 6 is a sectional side elevation of the same on the line 6—6 of Fig. 5;

Fig. 7 is a similar view of the same on the line 7—7 of Fig. 5;

Fig. 8 is a like view of the same on the line 8—8 of Fig. 5;

Fig. 9 is a plan view of the same with the cover of the switch box removed;

Fig. 10 is an enlarged sectional side elevation of the actuating device;

Fig. 11 is a plan view of the same with the cover removed and showing the connection with the motor and the limit switch diagrammatically; and Fig. 12 is a cross section of the same.

The vehicle 20, shown in outline in Fig. 1, is provided with the usual vehicle brake 21 connected with the rear wheels 22 to brake the same for stopping or slowing up the vehicle whenever it is desired to do so by the chauffeur or driver of the vehicle. The vehicle brake 21 is controlled by a spring motor 23 provided with a casing 24 attached to the chassis or framework 25 of the vehicle 20. The spring motor 23 is wound up by a power-driven motor 26, preferably an electric motor of any approved construction, and is released by a clutch mechanism intermediate the motors 23 and 26.

The spring motor 23 is arranged as follows, special reference being had to Figs. 3, 4, 5, 7 and 8: In the casing 24 is journaled a shaft 30 on which is secured the inner end of a helical spring 31 having its outer end attached to a pin 32 secured to the casing 24, as plainly indicated in Figs. 5 and 6. On the spring motor shaft 30 within the casing 24 is secured an arm 33 provided with diametrically disposed studs 34 on each of which is mounted to turn loosely a pinion 35 in mesh with an internal gear wheel 36 secured to the inside of the casing 24. On each pinion 35 is secured or formed a gear wheel 37 in mesh with a pinion 38 having an extended hub 39 mounted to turn loosely on an extension 40 of the spring motor shaft 30. On the hub 39 of the pinion 38 is secured a hub 41 of a clutch member 42 operating in conjunction with a clutch member 43 and with flat friction rings 44 to form a clutch, the said clutch member 42 being the controlling clutch member and the clutch member 43 being the power-driven clutch member on account of being driven by the electric motor 26 previously mentioned. One half of the friction rings 44 are keyed on the clutch member 42 and the other half of the friction rings are keyed on the clutch member 43 to rotate with the clutch members 42 and 43. The rings on the clutch members 42 and 43 are arranged alternately as plainly shown in Fig. 5. Each friction ring 44 is preferably provided with struck-up spring tongues to allow of a gradual opening or a closing of the clutch whenever the clutch member 42 is moved to the right or to the left, as hereinafter more fully explained. The shaft 45 of the power-driven motor 26 is coupled to a worm shaft 46 (see Fig. 7) of a worm 47 in mesh with a worm wheel 48 forming part of the clutch member 43. The clutch member 43 is provided with a hub 49 mounted to rotate loosely on the hub 39 of the pinion 38. A spring 50 is coiled on a portion of the hub 39 and presses with one end against the hub 41 so as to hold the controlling clutch member 42 normally in firm engagement with the friction rings 44 to press the latter against the other clutch member 43. When the worm 47 is now rotated from the power-driven motor 26 then the clutch members 43, 44 and 42 are rotated and the rotary motion of the clutch member 42 is transmitted to the pinion 38 which in turn rotates the gear wheels 37 and the pinions 35, and as the latter are in mesh with the fixed internal gear wheel 36 it is evident that the arm 33 is carried around whereby the shaft 30 is rotated and the spring 31 is wound up. When the clutch member 42 is shifted, as hereinafter more fully described, from the left to the right against the tension of the spring 50 (see Fig. 5) then the clutch is opened to allow rotation of the clutch member 42 without rotation of the clutch member 43. When the parts are in this position the spring 31 is released and rotates the shaft 30 in the inverse direction, to apply the brake. It is understood that the arm 33, the pinions 35, the fixed internal gear wheel 36, the gear wheels 37 and the pinion 38 form a planetary gearing connecting the spring motor shaft 30 with the controlling member 42 of the clutch to allow the motor spring 31 to unwind and apply the brake whenever the controlling member 42 is moved into open position. The planetary gearing causes a winding up of the spring 31 whenever the clutch member 43 is driven and the friction rings 44 are clamped between the clutch members 43 and 44 by the spring-pressed clutch member 42 at the time the latter is moved to the left. It is further understood that when the clutch member 42 is in open position the clutch member 43 is held against backward turning by the worm wheel 48 and the worm 47.

In order to impart a sliding movement from the left to the right to the clutch member 42, the following arrangement is made: The right-hand end of the hub 39 is provided with a head 60 engaged at its inner face by bearing balls 61 pressed on by a washer 62 engaged at the back by pins 63 (see Fig. 4) mounted on a lever 64 fulcrumed at its lower end at 65 on the casing 24. The free upper end of the lever 64 is provided with a bearing plate 66 in contact with a cam 67, secured on a cam shaft 68 extending longitudinally and journaled in suitable bearings 69 and 70, of which the bearing 69 is attached to the casing 24 and the bearing 70 is attached to the foot board 71 of the vehicle 20 (see Figs. 1 and 2). On the shaft 68 (see Figs. 1 and 2) is secured a pinion 72 in mesh with a vertically disposed rack 73 mounted to slide up and down in bearings 74 and 75, of which the bearings 74 is attached to the under side of the foot board 71 and the bearings 75 is attached to the bottom of the vehicle 20. The lower end of the rack 73 is connected with one end of a spring 76 attached at its other end to a fixed part of the vehicle 20. The rack 73 is adapted to be moved up and down by an arm 80 projecting from a transverse shaft 81 journaled in a box 82 attached to the under side of the foot board 71. On the shaft 81 is secured an upwardly extending arm 83 on the upper end of which is mounted to swing laterally a pedal 84 under the control of the operator in charge of the vehicle. Normally the rack 73 is in lowermost position with the pedal 84 extending approximately in a horizontal direction and with the cam 67 at the point of its least throw, as indicated in Fig. 5. When the pedal 84 is compressed by the operator then the rack 73 is caused to move upward and in doing so to rotate the pinion 72 and the cam shaft 68 whereby the cam 67 imparts an outward swinging motion to the lever 64 to move the head 60 and consequently the hub 39 and with it the controlling clutch member 42 to the right to release the motor spring 31 as previously explained. When the operator releases the pedal 84 then the spring 76 returns the several parts to their normal position shown in Figs. 1, 2 and 5. The pedal 84 when swung downward may also be turned sidewise by the operator and into engagement with a keeper 85 attached to the foot board 71. Thus the brake may be kept in applied position when the operator removes his foot from the pedal or in case the operator leaves the car. The pivotal end of the pedal 84 is provided with a hollow projection 86 normally engaging a notch 87 in the foot board 71 to limit the upward swinging movement of the pedal 84. In the projection 86 is mounted a spring-pressed ball 88 bearing against the arm 83 to hold the pedal against accidental sidewise swinging motion.

The connection between the spring motor shaft 30 and the brake mechanism 21 is arranged as follows: On the outer end of the shaft 30 is secured a drum 90 on which winds and unwinds a cable, chain or other flexible connection 91 attached to a link 92 pivotally connected with an arm 93 fulcrumed on the chassis or other part of the vehicle 20. The arm 93 is connected by a link 94 with a lever 95 of the usual brake mechanism 21 and controlling the brake band 96 adapted to engage the brake wheel 97 on the rear traction wheel 22 of the vehicle 20. When the motor spring 31 is wound up then the brake mechanism 21 is in released position, and when the motor spring unwinds and rotates the shaft 30, as previously explained, then the drum 90 winds up the flexible connection 91 whereby the brake mechanism 21 is actuated to apply the brake. Thus the brake mechanism 21 is held applied by the force of the spring 31 of the spring motor, it being understood that the spring 31 went into action when the pedal 84 was swung downward by the operator. When the operator releases the pedal 84 the motor 26 is started to wind up the spring 31 thus releasing the brake mechanism 20.

In order to start and stop the spring motor 26 use is made of a controlling switch 100 mounted in the casing 82 and a limit switch 101 mounted in the casing 102 attached to the top of the casing 24. The controlling switch is arranged as follows, special reference being had to Figs. 10, 11 and 12: On the shaft 81 is secured a switch arm 110 normally in engagement with two contacts 111 and 112 arranged within the casing 82. The contact 111 is connected by a circuit wire 113 with a source of electrical energy 114 and the motor 26, and the contact 112 is connected by a circuit wire 115 with a contact 116 of the limit switch 101 having the other contact 117 connected by a circuit wire 118 with the motor 26 to complete the circuit. The limit switch 101 is controlled from the spring motor shaft 30 and is arranged in detail as follows: On the drum 90 attached to the shaft 30 is secured an arm 120 provided at its free end with a tooth 121 normally extending between two teeth 122 formed on the outer end of an arm 123 of a bell crank lever mounted to swing loosely on a vertically disposed pin or stud 124 secured to the casing 102. The other arm 125 of the bell crank lever mentioned extends between two arms 126 and 127 mounted to swing loosely on the stud 124. The free ends of the arms 126 and 127 are connected with each other by a spring 128 and the arm 126 is normally held between the arms of a spring clamp 129, and the other arm 127 is adapted to be clampingly engaged by the arms of a spring clamp 130. The arms 126 and 127 engage the ends of a crosspiece 131 formed on a lever 132 mounted to swing loosely on the stud 124. The free end of the lever 132 is provided with a head 133 adapted to pass between the two contacts 116 and 117 to electrically connect the same with each other to close the circuit for the motor 26. When the several parts are in the position shown in Figs. 5, 6, 8 and 9, and the spring 31 is released and unwinds for applying the brakes as previously explained, then the arm 120 imparts a swinging motion to the bell crank lever having the arms 123 and 125 to move the arm 127 into engagement with the clamp 130 thus placing the spring 128 under tension, and when this tension exceeds the tension with which the arm 126 is held in the spring clamp 129 then the arm 126 swings out of engagement with the clamp 129 and in doing so it swings the contact lever 132 over to engage the head 133 with the contact plates 116 and 117 to close the circuit at the limit switch 101. It is understood that the spring 31 was released on the operator pressing the pedal 84 and consequently the motor circuit was broken at the controlling switch 100 and as long as the pedal 84 is in compressed condition the circuit remains broken. When the operator releases the pedal 84 then the contact arm 110 moves into engagement with the contacts 111 and 112 thus closing the motor circuit at the controlling switch 100 and as the circuit is held closed at the limit switch 101 it is evident that the motor 26 is started and at the time the clutch member 42 is again in frictional engagement with the clutch member 43. The rotary motion of the motor 26 now causes a winding up of the spring 31 and a return movement of the arm 120 so that the arm 123 of the bell crank lever is swung back into normal position and in doing so the arm 125 engages the arm 126 and moves the same into engagement with the clamp 129 at the same time placing the spring 128 under tension. When this tension exceeds the tension with which the arm 127 is held in the clamp 130 then the said arm 127 is swung out of engagement with the clamp 130 by the action of the spring 128 and this movement of the arm 127 causes a return swinging movement of the contact lever 132 to move the head 133 thereof out from between the contacts 116 and 117. The circuit is now broken at the limit switch 101 and consequently the motor 26 comes automatically to a stop. It will be noticed that the circuit is closed and opened at the limit switch 101 by a quick snap movement of the contact lever 132 thus preventing arcing, and the head 133 is either fully out of engagement with the contact 116 or 117 or properly in engagement with the same thus insuring at all times a proper functioning of the switch.

The operation is as follows:

Normally the power-driven motor 26 is at rest and the spring 31 is wound up and held against unwinding by the members 42, 43 and 44 of the friction clutch, and of which the member 43 is locked against backward rotation by the worm wheel 48 and the worm 47. When the operator desires to apply the brake 21 then he presses the pedal 84 downward to open the controlling switch 100 in addition to the open limit switch 101 and at the same time an upward sliding movement is given to the rack 73 to turn the pinion 72 and consequently the cam shaft 68 which by its cam 67 imparts an outward swinging movement to the lever 64. This movement of the lever 64 causes the clutch member 42 to open the clutch thereby releasing the spring 31 and allowing the same to uncoil with a view to rotate the shaft 30 and with it the drum 90 to wind up the flexible connection 91. The brake mechanism 25 is now applied as long as the pedal 84 is kept pressed by the foot of the operator or is engaged with the keeper 85. During the uncoiling of the spring 31 the arm 120 actuates the limiting switch 101 so that the latter is closed but the controlling switch 100 remains open as long as the pedal 84 is pressed or locked in pressed position, and consequently the motor 26 is not started until the operator releases the pedal 84. When this takes place the arm 110 makes connection with the contacts 111 and 112 thus closing the controlling switch 100 and starting the motor 26. When the pedal is released the cam 67 is returned to its normal position to allow the spring 50 to return the clutch member 42 to normal clutching position so that the motor is now connected by the clutch mechanism and planetary gearing with the shaft 30 of the spring 31 and the latter is now wound up whereby the brake 21 is released. The return movement of the shaft 30 causes the arm 120 to open the limit switch 101 to break the motor circuit thereby stopping the motor 26 at the time the spring 31 is again fully wound up. The several parts of the brake mechanism are now again in normal position ready for applying the brake again whenever it is desired to do so.

The limit switch can be dispensed with and in this case the clutch members 42, 43 and 44 have a slipping movement one relative to the other after the spring is wound up to its full extent and with the motor 26 still running so that no damage is done by unwinding of the spring 31. When the spring 31 unwinds and a swinging motion is given to the arm 120, as previously explained, to apply the brake 21, but in case the latter is out of order an excessive swinging motion of the arm is arrested by the arm 120 engaging a projecting end of the pin 32 (see Fig. 5).

It is understood that I do not limit myself to the detail construction of the various devices as the same may be varied without deviating from the spirit of my invention.

Having thus described my invention, I claim as new and desire to secure by Letters Patent:

1. In combination, a spring motor, a power-driven motor, a clutch having a driven member and a controlling member, of which the driven member is driven from the said power-driven motor and the said controlling member is under the control of the operator for moving it in or out of engagement with the driven member, and a planetary gearing connecting the said controlling member with the said spring motor.

2. In combination, a spring motor having a shaft, a clutch having a power-driven member and a controlling member, the latter being slidable on the said spring motor shaft, a spring pressing the said controlling member to normally hold the latter in engagement with the said driven member, a planetary gearing connecting the said controlling member with the said spring motor, and actuating means under the control of an operator for moving the said controlling clutch member in and out of engagement with the said power-driven clutch member.

3. In combination, a spring motor having a shaft, a clutch having a power-driven member and a controlling member, the latter being slidable on the said spring motor shaft, a spring pressing the said controlling member to normally hold the latter in engagement with the said driven member, a planetary gearing connecting the said controlling member with the said spring motor, a lever engaging the hub of the said controlling clutch member, a cam shaft having a cam engaging the said lever, and means for turning the said cam shaft.

4. In combination, a spring motor, a clutch having a power-driven member and a controlling member, a planetary gearing connecting the said controlling clutch member with the said spring motor, and actuating means controlled by an operator for moving the said clutch members in and out of engagement with each other.

5. In combination, a spring motor, a clutch having a power-driven member and a controlling member, a planetary gearing connecting the said controlling clutch member with the said spring motor, actuating means controlled by an operator for moving the said clutch members in and out of engagement with each other, an electric motor, and a controlling switch connected with the said actuating means for starting the said electric motor.

6. In combination, a spring motor, a clutch having a power-driven member and a controlling member, a planetary gearing connecting the said controlling clutch member with the said spring motor, actuating means controlled by an operator for moving the said clutch members in and out of engagement with each other, an electric motor, a limit switch controlled by the said spring motor for stopping the said electric motor, and a controlling switch connected with the said actuating means for starting the said electric motor.

7. In combination, a spring motor having a shaft, a clutch having a power driven member and a controlling member, the latter being slidable on the said spring motor shaft, a spring pressing the said controlling member to normally hold the latter in engagement with the said driven member, a planetary gearing connecting the said controlling member with the said spring motor, a lever engaging the hub of the said controlling clutch member, a cam shaft having a cam engaging the said lever, a pinion on the said shaft, a spring-pressed rack in mesh with the said pinion, and a pedal connected with the said rack.

8. In combination, a spring motor having a shaft, a clutch having a power-driven member and a controlling member, the latter being slidable on the said spring motor shaft, a spring pressing the said controlling member to normally hold the latter in engagement with the said driven member, a planetary gearing connecting the said controlling member with the said spring motor, a lever engaging the hub of the said controlling clutch member, a cam shaft having a cam engaging the said lever, a pinion on the said shaft, a spring-pressed rack in mesh with the said pinion, a pedal connected with the said rack and having an up and down and a sidewise swinging motion, and a keeper adapted to hold the said pedal in normal position and also in brake-applying position.

EDWARD A. DIETERICH.